(12) United States Patent
Powell

(10) Patent No.: US 6,996,398 B1
(45) Date of Patent: Feb. 7, 2006

(54) METHOD AND SYSTEM FOR INITIATING CHANGE IN A PREFERRED ROAMING LIST

(75) Inventor: John C. Powell, Marysville, OH (US)

(73) Assignee: Cellco Partnership, Bedminster, NJ (US)

( * ) Notice: Subject to any disclaimer, the term of this patent is extended or adjusted under 35 U.S.C. 154(b) by 430 days.

(21) Appl. No.: 10/116,762

(22) Filed: Apr. 3, 2002

(51) Int. Cl.
    *H04Q 7/20* (2006.01)
(52) U.S. Cl. .................. 455/433; 455/432.1; 455/466; 455/419; 455/418; 370/338
(58) Field of Classification Search ............... 455/433, 455/419, 466, 432.3, 432.1; 705/1; 715/854
    See application file for complete search history.

(56) References Cited

U.S. PATENT DOCUMENTS

| | | | |
|---|---|---|---|
| 5,283,731 A * | 2/1994 | Lalonde et al. ................ | 705/1 |
| 5,761,618 A * | 6/1998 | Lynch et al. ................ | 455/419 |
| 5,920,821 A * | 7/1999 | Seazholtz et al. ........... | 455/466 |
| 5,950,130 A * | 9/1999 | Coursey .................. | 455/432.1 |
| 5,999,811 A * | 12/1999 | Molne ...................... | 455/432.3 |
| 6,047,071 A * | 4/2000 | Shah .......................... | 380/273 |
| 6,144,849 A * | 11/2000 | Nodoushani et al. ....... | 455/419 |
| 6,148,197 A * | 11/2000 | Bridges et al. .......... | 455/432.3 |
| 6,195,546 B1 * | 2/2001 | Leung et al. ............... | 455/419 |
| 6,262,735 B1 * | 7/2001 | Etelapera ................... | 715/854 |
| 6,311,057 B1 * | 10/2001 | Barvesten ................... | 455/415 |
| 6,453,164 B1 * | 9/2002 | Fuller et al. ................ | 455/445 |
| 6,529,729 B1 * | 3/2003 | Nodoushani et al. ....... | 455/419 |
| 6,549,770 B1 * | 4/2003 | Marran ........................ | 455/419 |
| 6,564,055 B1 * | 5/2003 | Hronek ....................... | 455/433 |
| 6,625,451 B1 * | 9/2003 | La Medica et al. ......... | 455/434 |

OTHER PUBLICATIONS

TIA/EIA Standard 637-B, "Short Message Services for Wideband Spread Spectrum Systems", Jan. 2002.
TIA/EIA/IS-683-A, "Over-the-air Service Provisioning of Mobile Stations in Spread Spectrum Systems" May 1998.

* cited by examiner

*Primary Examiner*—William Trost
*Assistant Examiner*—Chuck Huynh
(74) *Attorney, Agent, or Firm*—Darby & Darby

(57) ABSTRACT

A method and system for updating a preferred roaming list in a mobile communications device includes: (1) a network programmed to send a message to a mobile communication device; and (2) a voice prompting unit configured to prompt a subscriber of a wireless carrier to enter data via the mobile communications device to thereby initiate a change in a preferred roaming list of the mobile communications device. In a preferred, exemplary embodiment, the SMS message includes text that requests the subscriber call the voice prompting unit.

16 Claims, 2 Drawing Sheets ical field of the present invention, a method for updating a preferred roaming list in a mobile communications device is provided. The steps of the method include: (1) receiving a text-based message at the mobile communications device, where the text-based message includes predetermined information; and (2) at the mobile communications device, the predetermined information being utilized to initiate a change in the preferred roaming list of the mobile communications device. In an exemplary embodiment of the invention, the message may be an SMS message and the change may be accomplished using over the air programming which is initiated by way of a voice prompting unit.

US 6,996,398 B1

METHOD AND SYSTEM FOR INITIATING CHANGE IN A PREFERRED ROAMING LIST

RELEVANT FIELD

The present invention concerns mobile wireless communication devices. More particularly, the present invention is directed to a method and system of using messaging to initiate a change in a preferred roaming list ("PRL") of a mobile communication device.

BACKGROUND

It is known that wireless carriers provide their subscribers' wireless telephones with a preferred roaming list or table. As is known in the art, the preferred roaming list includes a list of system IDs ("SIDs") stored on configurable memory of the wireless telephone. A subscriber's wireless telephone uses the preferred roaming list to determine the system on which the wireless telephone is to operate based on the telephone's physical location. For example, when a subscriber is roaming in an area where the subscriber's wireless network does not itself provide service, the subscriber's cellular telephone references the preferred roaming list and selects a particular SID of a different carrier from the list of SIDs programmed in the preferred roaming list. The system identified by the selected SID is then utilized to complete the subscriber's call.

Typically, the SID is selected from the preferred roaming list based on a predetermined priority. The priority of each SID is preferably based on the rate at which the call on the identified system will be charged to the subscriber's wireless carrier. Thus, the SID identifying the system that charges the best, i.e. lowest, rate to the subscriber's carrier will have the highest priority. Often, this SID will identify the subscriber's own carrier. Other criteria, e.g., availability of digital services, may also govern the order in which the SIDs are prioritized in the preferred roaming list.

Typically, a preferred roaming list is initially programmed when a subscriber's phone is first activated. Thereafter, it may be reprogrammed, i.e. the list of SIDs in the preferred roaming list may be changed manually by the carrier or it may be changed via over the air programming (OTAP). TIA/EIA/IS-683-A specifies over the air programming for analog or CDMA systems which can be used to remotely change a preferred roaming list of a subscriber's mobile device.

From time to time, wireless carriers renegotiate their roaming service contracts with other wireless carriers and may even add or partner with new carriers. Also, a wireless carrier may install new equipment and provide new services in a particular geographic region. Accordingly, over time, the preferred roaming list originally provided to a subscriber's mobile phone may not presently reflect the best, i.e. most advantageous, configuration of preferred system identifications.

To remedy this situation, wireless carriers often request that their subscribers initiate a preferred roaming list change. The change is accomplished using over the air programming which can be initiated by the subscriber.

As an example, the wireless carrier instructs the subscriber to dial a certain number using their wireless handset. In the Verizon Wireless® system, the subscriber is requested to dial *228. The subscriber then hears a series of voice prompts requesting depression of certain keys of the subscriber's wireless telephone. Upon successful completion of the voice prompt procedure, over the air programming of the subscriber's preferred roaming list occurs.

A wireless carrier typically requests that a subscriber initiate the preferred roaming list change by making such request in writing via the subscriber's monthly billing statement. Because this manner of request is not convenient or conducive to immediate action by the subscriber, wireless carriers have a low response rate to such requests and are generally unsuccessful in promoting preferred roaming list changes.

What is needed, therefore, and heretofore has not been available, is a method and system for effectively inducing subscriber-initiated change of a preferred roaming list in a subscriber's mobile device and, what is further needed is such a method that is initiated solely through interaction with a mobile communications device.

SUMMARY

In one aspect of the present invention, a method for updating a preferred roaming list in a mobile communications device is provided. The steps of the method include: (1) receiving a text-based message at the mobile communications device, where the text-based message includes predetermined information; and (2) at the mobile communications device, the predetermined information being utilized to initiate a change in the preferred roaming list of the mobile communications device. In an exemplary embodiment of the invention, the message may be an SMS message and the change may be accomplished using over the air programming which is initiated by way of a voice prompting unit.

In another aspect of the present invention, a system for initiating a change in the preferred roaming list of one or more mobile communication devices is provided. The system includes: (1) a messaging network programmed to send a message to a mobile communication device; and (2) a voice prompting unit configured to prompt a subscriber of a wireless carrier to enter data via the mobile communications device to thereby initiate a change in a preferred roaming list of the mobile communications device. In a preferred, exemplary embodiment, the message is an SMS message and includes text that requests the subscriber call the voice prompting unit.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF AN EXEMPLARY EMBODIMENT OF THE PRESENT INVENTION

A method and system of an exemplary embodiment of the present invention described herein utilizes known components and conventions of a wireless network, including an SMS network, to effectively prompt a subscriber to initiate a change in the subscriber's wireless phone via messages. The invention, however, can be implemented in different embodiments than described below, as understood by those of skill in the art, so as to induce a subscriber-initiated change or update to a preferred roaming list free of resort to communications outside of the wireless network.

Figure 1:
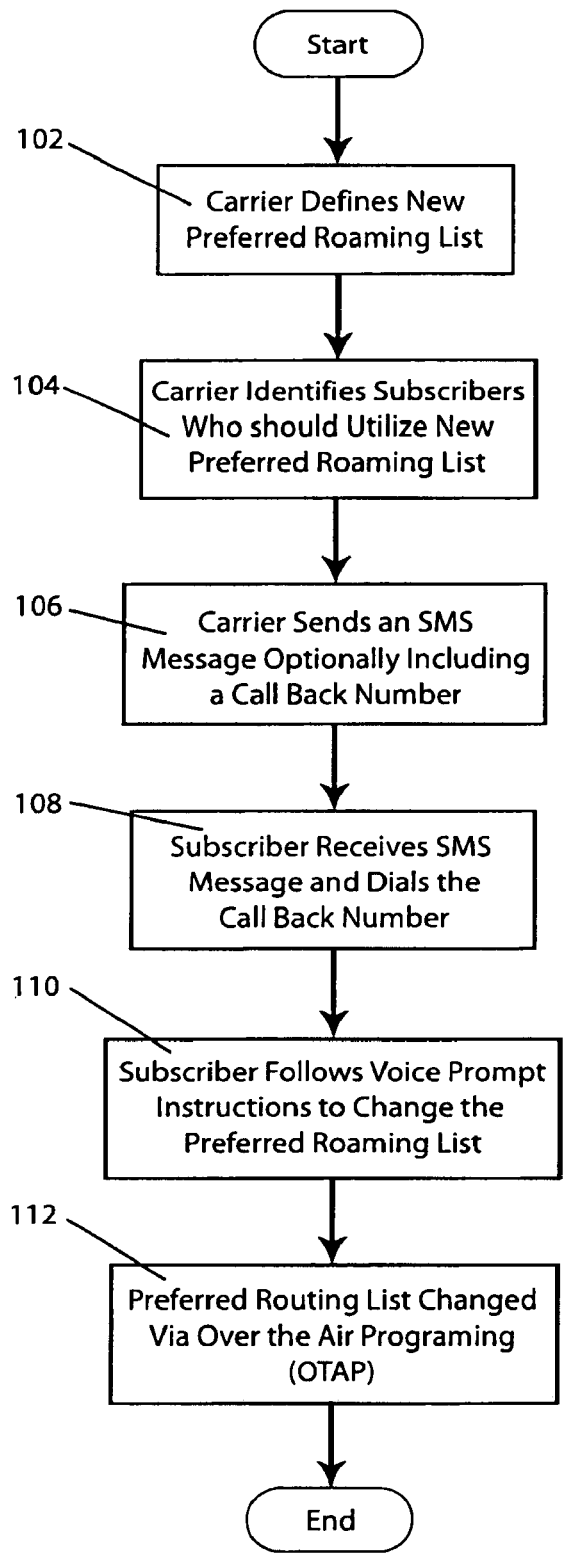
FIG. 1 is a flow chart of an exemplary method in which an SMS message is utilized to request a subscriber to initiate a change in the preferred roaming list of a subscriber's mobile device.

A method for prompting a subscriber-initiated change of the subscriber's preferred roaming list by utilizing text-based messages, e.g., SMS messages, is illustrated in the flow chart of FIG. 1.

At step 102, the subscriber's wireless carrier creates or defines a new preferred roaming list as a result of any of a number of circumstances, e.g., as a result of new or renegotiated service contracts and partnerships with other wireless carriers or as a result of new equipment being installed by the wireless carrier in a geographic region previously not served or served differently (e.g., previously only analog service) by the wireless carrier.

At step 104, the subscriber's wireless carrier identifies those subscribers who are candidates for receiving and utilizing the new preferred roaming list. The wireless carrier may desire to institute the change for all of its subscribers' devices, in which case all subscribers are identified. However, there may be instances where only certain subscribers are identified, e.g., those in a particular "home" region, but not others, to receive an updated preferred roaming list. Such selective modifications may result, e.g., from the terms of the renegotiated contracts with the other wireless carriers.

At step 106, the wireless carrier sends an SMS message to each of the subscribers identified at step 104. The SMS message includes text that urges the subscriber to dial a particular telephone number to initiate a preferred roaming list change. If the subscriber's carrier intends to pass all or part of the resulting cost savings on to the subscriber, a savings notice may be included in the SMS message to provide additional incentive to the subscriber to make the requested call. Other incentives can be offered together with the SMS message to induce the subscriber to initiate the requested call.

In one embodiment, the SMS message may simply include the number to call, e.g., "*228", in the text of the SMS message and leave it to the subscriber to manually dial the number. Preferably, however, the number to be used to initiate the change in the preferred roaming list is included as the call back number of the SMS message. TIA/EIA-637B sec. 4.5.15 defines the Call-Back Number Subparameter for SMS services operating on CDMA systems to implement this feature. In this manner, the user need only press one or two buttons to begin the call and initiate the change or update to the preferred roaming table.

At step 108, the user receives the SMS message requesting that the subscriber call the indicated number to initiate the change in or update to the preferred roaming list. The user then initiates the call as requested.

At step 110, having initiated the call as requested, the subscriber hears a voice recording prompting the subscriber to initiate a change in the preferred roaming list of the subscriber's wireless phone. The voice prompting system utilized may be any of those currently known and used in the art to prompt a user to initiate over the air programming of a subscriber's wireless telephone. The user follows the voice prompt instructions, e.g., by pressing certain numbers on the keypad of the mobile telephone in response to the voice prompts or, by stating or repeating certain phrases or words in the case where a voice response unit is utilized to receiver user input via spoken words.

At step 112, as a result of the subscriber successfully following the voice prompts of step 110, the subscriber's preferred roaming list is changed in the known manner, utilizing over that air programming as in TIA/EIA/IS-683-A. The change can include alterations of existing data in the preferred roaming list or updates to the preferred roaming list to include new data.

Thus, in accordance with the above-described embodiment of a method of the present invention, a subscriber initiates a change in the subscriber's mobile device in response to a SMS message received from the subscriber's wireless carrier.

Preferably, the SMS messages that are sent at step 106 are automatically generated by the wireless carrier, for example, such messages can be generated in response to the carrier making a change to the preferred roaming list or in response to the lapse of a prescribed times period since the last update to or since enrollment by a particular subscriber.

Figure 2:
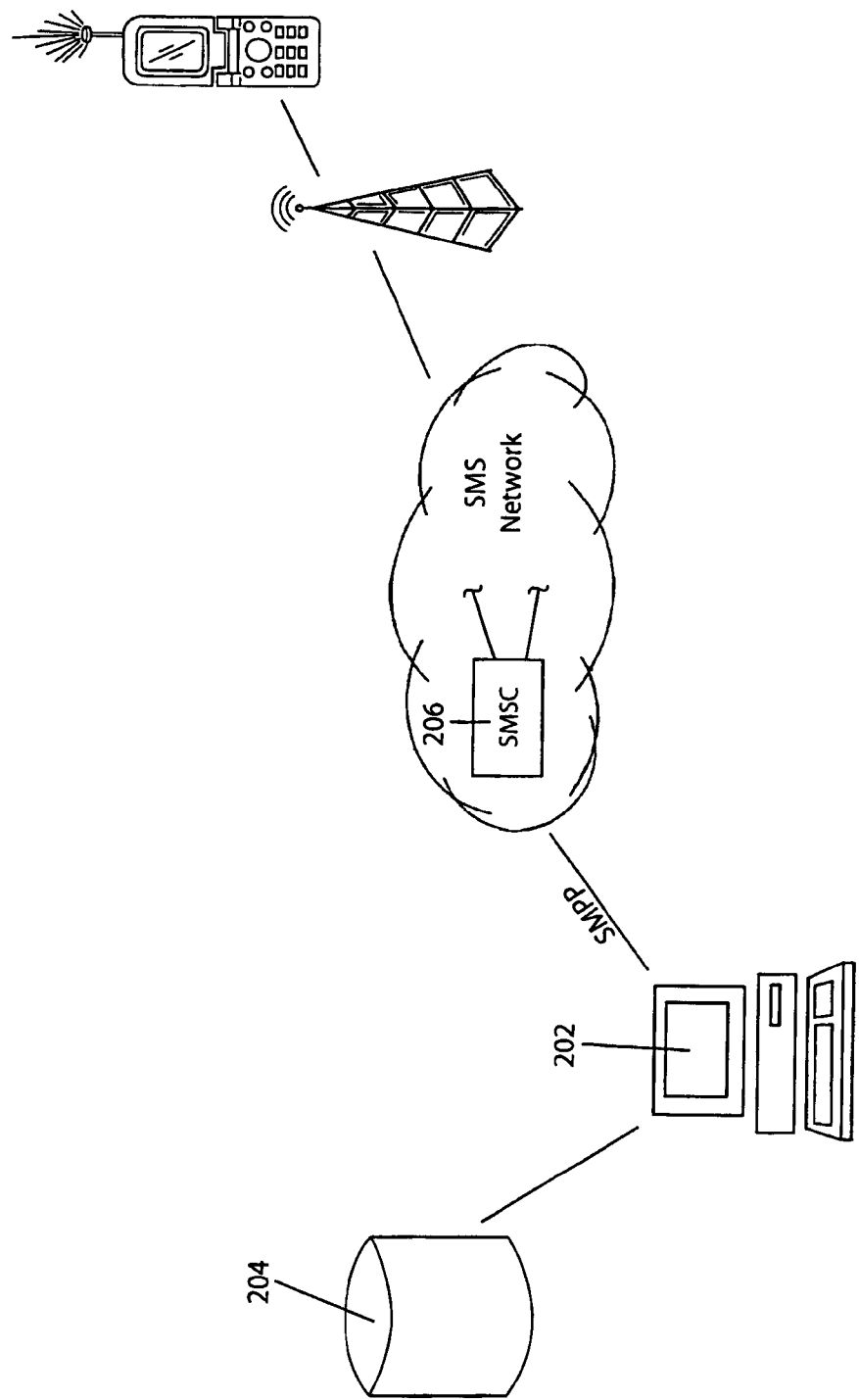
FIG. 2 illustrates an exemplary system for automatically generating the messages of FIG. 1.

FIG. 2 illustrates an embodiment of a system that can be utilized to automatically generate and send SMS messages to a subscriber for prompting a subscriber to initiate a change in a preferred roaming list.

With continued reference to FIG. 2, any known programmable microprocessor-based computer 202 interfaces with any of a wireless carrier's subscriber database lists maintained at database 204. Database 204 contains subscriber information, including subscriber Mobile Identification Numbers ("MIN").

Computer 202 is programmed using any known programming language, e.g., "C", to retrieve MIN information from database 204 using appropriate database calls. Computer 202 retrieves MINs identifying those mobile communication devices that are to receive an SMS message in accordance with the present invention and writes those MINs to a text file stored on computer 202. Computer 202 then sends messages to the mobile communications device identified by each MIN by sending SMPP-based packets to SMSC 206 of the SMS network.

Computer 202, which creates the SMPP packet in accordance with the known Short Message Point to Point Protocol v.3.4., populates the SMPP text-message field with the previously-described text message urging the recipient to initiate a change in the mobile communication device's preferred roaming list. Computer 202 also populates the destination address field of the SMPP packet with the MIN of the mobile communications device to which the present SMS message is directed. Preferably, computer 202 also populates the "call-back num" parameter of the SMPP packet with the call back number, e.g., "*228".

When SMSC 206 receives the SMPP packet from computer 202, SMSC 206 creates an SMS packet, e.g., in accordance with EIA/TIA 637, and forwards the packet to the mobile communications device identified by the MIN.

The SMPP packets generated by computer 202 are preferably sent to SMSC 206 in a periodic or staggered manner. This prevents the SMS network from becoming overloaded when attempting to deliver SMS messages to multiple mobile communication devices at the same time. As an example, computer 202 may be programmed to send an SMPP packet to SMSC 206 every 1 minute.

The above-described embodiments of the present invention are merely illustrative. Variations in the above-described embodiments may be made without departing from the scope of the present invention, which is defined solely by the claims which follow. As an example, the present invention may be utilized to initiate the change of a preferred roaming list in any type of mobile communications device that utilizes a preferred roaming list or similar table. Moreover, any type of messaging convention that is capable of providing a message to the mobile device may be utilized and is not necessarily limited to SMS messaging. Additionally, any type of messaging convention may be utilized to initiate the described preferred roaming list change.

I claim:

1. A system for inviting each of a plurality of mobile communications subscribers to initiate change in a preferred roaming list of one of a plurality of mobile communication devices, comprising:
 a voice prompting unit, the voice prompting unit configured to request that one of the plurality of mobile communications subscribers input data to the subscriber's mobile communications device to thereby initiate a change in a preferred roaming list of the mobile communications device; and
 a messaging network, the messaging network being programmed to send a message to the mobile communication device, the message requesting that the subscriber call the voice prompting unit to initiate the change in the preferred roaming list.

2. The system of claim 1, wherein the mobile communication device is a wireless telephone and the messaging network is an SMS network.

3. The system of claim 2, further comprising:
 a database, the database storing predetermined information about a plurality of subscribers to the wireless carrier; and
 a computer, the computer being programmed to retrieved certain of the predetermined information about the subscribers and to generate and send a packet of information to the SMS network,
 wherein the packet of information is used by the SMS network to create the SMS message requesting that the subscriber call the voice prompting unit.

4. The system of claim 3, wherein the predetermined information includes the mobile identification numbers of the subscribers.

5. The system of claim 3, wherein the packet of information is sent to the SMS network via a short message service center (SMSC).

6. The system of claim 5, wherein the packet of information is formatted in the short message peer-to-peer (SMPP) protocol.

7. The system of claim 3, wherein the computer generates and sends to the SMS network a plurality of packets of information corresponding to a plurality of subscribers to the wireless carrier.

8. The system of claim 7, wherein the computer sends the plurality of packets to the SMS network in a staggered manner.

9. A method of inviting each of Plurality of mobile communication subscribers to update a preferred roaming list in one of Plurality of mobile communications devices, comprising of steps of:
 (a) receiving a text-based message at one of Plurality of mobile communications devices, said text-based message including predetermined information;
 (b) responding to a subscriber command applying the predetermined information to access a wireless carrier via the mobile communications device wherein the step of accessing a wireless carrier further comprises accessing a voice Prompt unit of the wireless carrier by a subscriber initiated call from the one mobile communication device and
 (c) establishing an updated preferred roaming list in the mobile communication device via communications with the wireless carrier.

10. The method of claim 9, wherein the updated preferred roaming list is established by reprogramming a memory of the mobile communications device.

11. The method of claim 9, wherein the preferred roaming list includes one or more system identifications relating to one or more wireless carriers.

12. The method of claim 11, wherein the system identifications include an order of preference, said mobile communication device being programmed to select a system identification from the list in accordance with the order of preference.

13. The method of claim 9, wherein the mobile communication device is a wireless telephone.

14. The method of claim 9, wherein the predetermined information includes a telephone number for the wireless carrier.

15. The method of claim 14, wherein the telephone number is included as part of the text of the text-based message.

16. The method of claim 14, wherein the telephone number is included in the callback number parameter of the text-based message.

* * * * *

UNITED STATES PATENT AND TRADEMARK OFFICE
CERTIFICATE OF CORRECTION

PATENT NO. : 6,996,398 B1
DATED : February 7, 2006
INVENTOR(S) : John C. Powell

It is certified that error appears in the above-identified patent and that said Letters Patent is hereby corrected as shown below:

Title page,
Item [73], Assignee, delete "Cellco Partnership, Bedminster, NJ" and substitute
-- Cellco Partnership, D/B/A Verizon Wireless, Bedminster, NJ --.

Signed and Sealed this

Sixth Day of June, 2006

JON W. DUDAS
*Director of the United States Patent and Trademark Office*